United States Patent Office 2,699,514
Patented Jan. 11, 1955

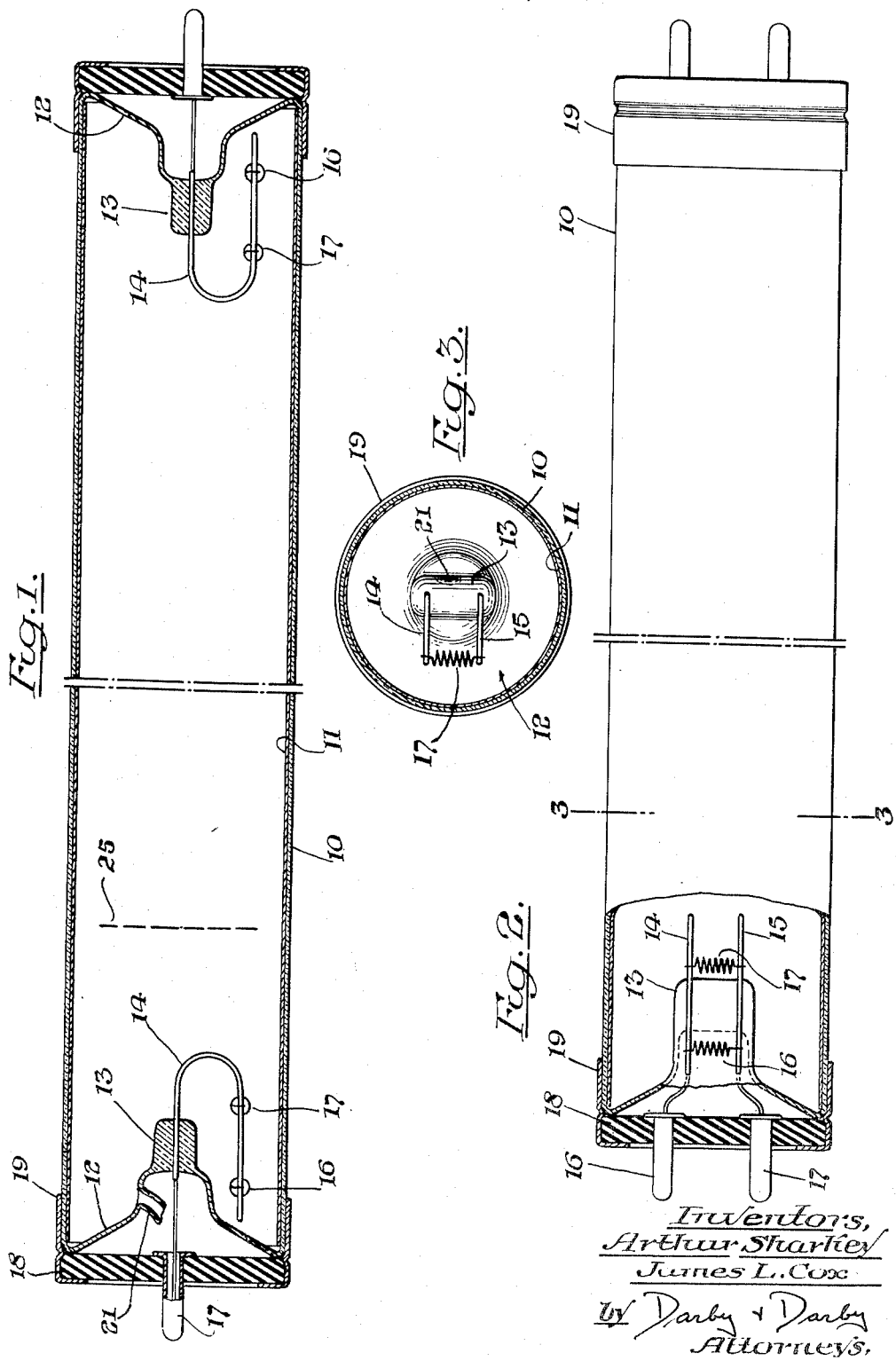

2,699,514

FLUORESCENT LAMP

James L. Cox, Ramsey, and Arthur Sharkey, Haworth, N. J., assignors to Duro-Test Corporation, North Bergen, N. J., a corporation of New York Application November 28, 1951, Serial No. 258,644

7 Claims. (Cl. 313—109)

This invention relates to improvements in fluorescent lamps and in particular to the structural arrangement of electrodes in such lamps.

A fundamental object of the invention is to increase the life of fluorescent lamps through the agency of multiple emissive electrodes at each end of the tube.

A second object of the invention is to provide a multiple electrode fluorescent lamp arranged and constructed so that one electrode of each multiple arrangement will always be an active one until it is worn out or broken.

A further object of the invention is to provide a fluorescent lamp having multiple electrodes at each of the ends thereof, one of each multiple to be selectively more active than the other, so that the discharge will occur between such pairs until they are worn out, whereupon on restarting, another electrode of each multiple will become active.

A further object of the invention is to provide multiple electrodes for each end of a fluorescent lamp in which each of the electrodes will have a different starting temperature so that a progressive increase in starting temperatures is provided.

A further object of the invention is to provide a fluorescent lamp having a multiple electrode structure for each end, arranged so that a pair formed of one electrode of each multiple will be rendered active by reason of the spatial relationship until worn out, whereupon another pair will be rendered active.

A further object of the invention is to provide a multiple electrode structure for a fluorescent lamp wherein an improved light output per tube is gained by virtue of the construction of the electrodes at the ends.

Another object of the invention is to provide a multiple electrode structure wherein any discoloration occurring on the ends of fluorescent tubes, a common phenomenon, is minimized or substantially eliminated.

Another object of the invention is to provide fluorescent tube structures wherein shadow effects in the ends of the tubes are substantially eliminated.

A further object of the invention is to provide an electrode structure wherein the cathodes in the ends of the tube are placed out of the path provided for the exhaustion of hot gases during evacuation of the tube.

Other objects and advantages of the invention will in part be obvious and in part will appear hereinafter.

The invention is embodied in a fluorescent tube characterized by an electrode structure wherein the electrode lead in wires thus are effective in causing the discharge to take place from a point corresponding to one extreme end of the tube to the corresponding opposite end, the invention being embodied in the features of construction combination element and arrangement of parts constituting an electrode structure for a fluorescent tube built in accordance with the following specification.

In the drawing, Figure 1 constitutes a longitudinal section of one form of the tube, one end thereof being in finished condition, the other showing the arrangement of parts prior to exhaustion of the tube itself.

Figure 2 is a view of the tube constituting a longitudinal section of one end of the tube to show the electrode arrangement therein; and Figure 3 is a transverse section across the tube, showing the relationship of the electrode support structure to the tube itself.

In one aspect of the invention, it is of course concerned with a fluorescent lamp construction whereby an extended useful life of the device is insured, this characteristic being achieved by providing the lamps with a plurality of electron emissive electrodes at each end. Further, in accordance with the invention, either by reason of differences in emissive activity of the individual electrodes in any one end structure, or the spatial relationship between the electrodes, a corresponding pair of electrodes of the multiple sets is always rendered active to carry the discharge until it is destroyed, whereupon another pair of the multiple sets becomes active. In this manner, pairs of electrodes, one in each end of the tube, are selectively activated to insure that a particular pair would become active. This operation will continue until all the electrodes at one end of the lamp are worn out thereby indicating the end of its useful life.

The plural electrode structures with the reflux supporting wires put the active electrodes close to the end cap of the tube, thereby accomplishing a material gain in light output. Conventional straight long lead in wires place the active electrodes several inches within the tube away from the end and make no use of emissive coating on the inside of the glass tube in the vicinity of the end of the tube. Experience indicates that this reflex construction of the electrodes in the ends of the tube in a 30 inch tube will add about two to three inches of effective lighting to each end of the tube.

Where the ends of the lead in wires are directed toward the back end or base of the tube, the points do not develop corona discharge thereby to serve as a source of discoloration of the tube. The only possibility for this sputtering of lead in wires in this reflex construction for supporting the electrodes of the tube is to have a discharge over the long arc of one bend to the long arc of the other, and because the area is thus extended the discharge is substantially eliminated.

Also, since the emissive discharge occurs from a point close to each end of the tube, the shadow effect commonly observable in tubes of conventional construction is avoided.

In tubes of this type evacuation of the space is accomplished by heating the tube and withdrawing the hot gases through an opening at one end thereof. By orienting the evacuation opening toward one side of the tube away from the side to which the electrodes are oriented, the path of the hot gases is diverted from the electrodes themselves, thereby avoiding the electrode erosion which, in the conventional tubes, is a serious problem.

In the drawings one preferred form of the invention involving a plural electrode is illustrated. The illustration is drawn to a lamp structure showing double electrodes at each end of the tube, but the principles set forth above apply to any pair of electrodes, one in each end of the tube, built in accordance with the instant invention. Thus, most of the advantages gained with this structure would follow with single electrodes.

The tube shown in Figure 1 consists of an envelope 10 having an inner coating 11 of appropriate fluorescent characteristics deposited thereon in accordance with common practice in the art. The envelope 10 is an elongated cylindrical body closed at each end by re-entrant stem or supporting section 12 terminating in sealed support presses 13 which carry the lead in wires 14 and 15.

Cross-supported on the lead in wires 14 and 15 are the parallel electrodes or coils 16 and 17 which may take any of the usual forms and normally will consist of coils or coiled coils. The coils are provided with suitable electron emissive coating.

The conductive supports 14 and 15 are connected to the electrical terminal pins 16 and 17, which are sealed into the terminal insulating disc 18, held to the end of the tube by means of flanged ferrule 19.

The construction illustrated, of course, is that of a two-coil electrode in each of the lamps and in accordance with one aspect of the invention, the coating on the filament designated 16 as opposed to that designated 17 would be of a different composition. A typical instance would be to apply a higher barium content on one filament than on the other. For example, a typical coating for filament 16 would be 30 per cent barium, 60 per cent strontium, 10 per cent calcium carbonate. The coating for the filament 17 would be 60 per cent barium, 30 per cent strontium, 10 per cent calcium carbonate.

Accordingly, as is well understood in the art, the coating for coils 17 has greater electron emissivity for a given temperature condition. Assuming, therefore, that resistances of the filaments 16 and 17 are the same at starting, each will be heated to the same temperature, but the greater barium content of the coating for the filament 17 will cause greater electron emissivity with the result that the lamp discharge will first occur between the filaments 17 at the respective ends of the lamp. However, when the useful life of the filaments 17 terminates, or should one of these filaments break down, the discharge will occur between the remaining good filament 17 and the corresponding filament 16 at the other end of the tube. The discharge will thus continue in this manner, until the second filament 17 is, for example, destroyed, whereupon the discharge will occur between the remaining filament 16 at the respective ends of the lamp.

A similar result is secured in a modified fashion if the filaments 16 and 17 are constructed of wire of different sizes and of different resistances so that, in any case, assuming a coating of the same electron emissivity for both, there will be attained a higher temperature in the one than in the other, at starting and during operation, causing greater electron activity and insuring that the charges occur between them.

Thus the current will divide due to selective resistances between the wires so that the current to wire size ratio will be greater over one set of filaments causing them to attain a higher temperature at starting than the other set of filaments. By adjusting resistances it is possible to have the filaments 17, those nearest each other, to be the first to discharge. Upon termination of the useful life first, the second in that end of the lamp will take over and continue operation.

A similar result is secured by increasing the space between the filaments 16 and 17 so that upon starting the shorter discharge path between the two electrodes having the nearest proximity to each other will induce the first discharge to occur therebetween. By spacing them sufficiently apart the discharge path will be sufficient to induce such initial operation.

The advantages of the reflex structure of these lead in wires will be apparent from an inspection of the drawings. Thus, referring specifically to Figure 1, it will be seen, even assuming the lead in wires to be of the same length as those used in a conventional axial arrangement of electrodes, that in the conventional arrangement, the active discharge would be occurring from a point corresponding to the plane 25 dotted across the lamp, the remainder of the excitation of the coating in the tube being merely incidental to the excitation caused by the main discharge proceeding from there. With the reflex construction, it will be seen that the minimum gain in the directly excitable length of the tube is the distance between what would have been the location of a filament in the conventional tube to an indicated location thereof which is at a point in the tube practically corresponding to the terminus of the end cap 19. Thus, a substantial contribution to the light output of the tube is made in this manner.

As pointed out, by the elimination of sharp points of lead in wires directed toward each other sputtering in the tube is eliminated. Relatively large anode areas at the end of the tube face each other and no appreciable sputtering will occur. This also leads to a condition which permits substantially easier starting of the lamp, particularly where it is used on direct current.

Shown in Figure 1 and identified as 21 is an exhaust opening which is placed at the end of the tube. In assembly of the device, the tube is evacuated and tip 21 sealed off. In the evacuation of the conventional tube there is a strong axial rush of gas to the discharge opening, with the result that appreciable erosion of the electrode coating occurs and contributes to a shortening of its life. By constructing the tube in the reflex fashion the electrodes are moved toward the side of the supporting post away from the side through which evacuation is accomplished and thereby another incidental advantage of the reflex support is realized in that no appreciable evacuation erosion of the tube occurs.

From the preceding description, it will be understood how it is possible, in accordance with this invention, to produce fluorescent lamps having a substantially enhanced life by using a pair of electrodes or filaments at each end and arranging them with regard to electrical or physical characteristics or spacing to insure that they will become selectively active to carry the discharge.

Having described the invention with several embodiments it is to be understood that the practice thereof may be carried out with variations in detail herein discussed, but without departing from the spirit as set forth in the appended claims.

What is claimed:

1. A fluorescent lamp comprising a tube having a fluorescent coating on the interior surface thereof and electrodes in the ends for carrying a sustaining discharge, the electrode lead in wires being supported in a tube press and being characterized by a reflux form placing the active operating electrode filaments essentially adjacent to the plane of the terminal ends of the tube.

2. A lamp in accordance with claim 1 in which the electrodes are characterized by a plurality of parallel supported filaments spaced longitudinally of the tube, the pair of filaments relatively closest to each other having coatings of greater emissivity than pairs more distantly removed from each other.

3. A fluorescent lamp in accordance with claim 1 in which the electrodes are characterized by a plurality of parallel supported filaments in which the filaments in each set at each end of the lamp are of different resistances.

4. A fluorescent lamp having electrodes at each end comprising at least a pair of parallel connected filaments, said filaments being spaced longitudinally of the tube, the spacing between pairs being sufficiently great so that the pair nearest each other will be selectively activated to operate the lamp, the electrode lead-in wires at each end of the tube being supported in an inwardly extending press and being characterized by their reflex form.

5. A fluorescent lamp having cathodes at each end comprising at least a pair of filaments, said filaments having characteristics to assure that a particular pair is rendered operative upon starting throughout its normal life, said lamp being further characterized by the reflex construction of supporting wires for the filaments, the wires entering the tube through a press extending inwardly and substantially parallel to the axis, said supporting wires curving away from the axis and back into a direction parallel to the entering one and terminating at a point below the support post to hold the active operative filaments in a plane substantially coinciding with the end of the emissive coating of the tube.

6. An electrode supporting structure for fluorescent tubes comprising filament supports mounted in an insulating inwardly extending tube press, said supports being characterized by their reflex form wherein they curve away from the central axis of said support back into a direction substantially parallel to the entering one to hold the filaments in a plane close to the end of the tube.

7. An electrode support for fluorescent tubes in accordance with claim 6, characterized by a plurality of parallel supported filaments.

References Cited in the file of this patent

UNITED STATES PATENTS

| Number | Name | Date |
| --- | --- | --- |
| 2,009,839 | Found | July 30, 1935 |
| 2,069,135 | Cox | Jan. 26, 1937 |
| 2,094,668 | Pirani | Oct. 5, 1937 |
| 2,103,068 | Fehse | Dec. 21, 1937 |
| 2,141,933 | Perrott | Dec. 27, 1938 |
| 2,182,732 | Meyer | Dec. 5, 1939 |
| 2,488,716 | Elenbaas | Nov. 22, 1949 |